United States Patent
Lam et al.

(10) Patent No.: US 9,713,782 B2
(45) Date of Patent: Jul. 25, 2017

(54) FILTERS AND FILTER ARRANGEMENTS WHICH INCLUDE A FILTER AND A MANIFOLD ASSEMBLY

(71) Applicant: Pall Corporation, Port Washington, NY (US)

(72) Inventors: Vincent Lam, Austin, TX (US); Jacob Peter Vanderheyden, Saint Paul, MN (US); Mark William Foohey, Austin, TX (US); Tatsuya Hoshino, Ibaraki (JP)

(73) Assignee: Pall Corporation, Port Washington, NY (US)

( * ) Notice: Subject to any disclaimer, the term of this patent is extended or adjusted under 35 U.S.C. 154(b) by 300 days.

(21) Appl. No.: 14/076,736

(22) Filed: Nov. 11, 2013

(65) Prior Publication Data

US 2015/0129478 A1    May 14, 2015

(51) Int. Cl.
*B01D 35/30* (2006.01)
*B01D 35/31* (2006.01)

(52) U.S. Cl.
CPC .............. *B01D 35/30* (2013.01); *B01D 35/31* (2013.01); *B01D 2201/24* (2013.01); *B01D 2201/303* (2013.01); *B01D 2201/4023* (2013.01); *B01D 2201/4084* (2013.01)

(58) Field of Classification Search
CPC ................ B01D 35/31; B01D 2201/24; B01D 2201/303; B01D 2201/4084; B01D 2201/4015; B01D 27/08; B01D 35/30; B01D 2201/4023; B01D 2201/4061; C02F 1/003; C02F 1/28; C02F 1/283; C02F 2201/006

See application file for complete search history.

(56) References Cited

U.S. PATENT DOCUMENTS

| | | | |
|---|---|---|---|
| 5,925,245 | A | 7/1999 | Bradford et al. |
| D513,304 | S | 12/2005 | Suzuki |
| 7,021,667 | B2 | 4/2006 | Campbell et al. |
| 7,338,599 | B2 | 3/2008 | Hiranga et al. |
| 7,469,932 | B2 | 12/2008 | Niermeyer et al. |

(Continued)

FOREIGN PATENT DOCUMENTS

| | | |
|---|---|---|
| JP | 6077008 A | 5/1985 |
| JP | 2004-503357 A | 2/2004 |

(Continued)

*Primary Examiner* — Lucas Stelling
(74) *Attorney, Agent, or Firm* — Jeremy Jay

(57) ABSTRACT

A filter has first and second fittings, a permeable filter medium, and a housing. The housing defines a fluid flow path within the housing between the first and second fittings, and the permeable filter medium is arranged in the fluid flow path to remove one or more substances from a fluid flowing along the fluid flow path. A reservoir is positioned in an upper region of the housing and includes a wall surrounding the first and second fittings of the filter. Each of the fittings has a topmost portion and the wall of the reservoir has a topmost portion, the topmost portion of each filter fitting being at or below the topmost portion of the reservoir wall. A filter arrangement may include a filter and a manifold assembly having first and second fittings which may be sealingly coupled to or uncoupled from the first and second fittings of the filter.

4 Claims, 11 Drawing Sheets

(56) References Cited

U.S. PATENT DOCUMENTS

| | | |
|---|---|---|
| 8,069,991 B2 | 12/2011 | Norris et al. |
| 2003/0213736 A1 | 11/2003 | Hiranaga et al. |
| 2004/0182777 A1 | 9/2004 | Stankowski et al. |
| 2006/0124532 A1* | 6/2006 | Magnusson .......... B01D 35/153 210/420 |
| 2010/0163477 A1* | 7/2010 | Noh ....................... B01D 35/30 210/236 |
| 2011/0211976 A1 | 9/2011 | Magoon et al. |
| 2011/0247974 A1 | 10/2011 | Gale et al. |
| 2013/0031926 A1 | 2/2013 | Huda et al. |
| 2015/0113925 A1* | 4/2015 | Gatica ................... B01D 35/30 55/357 |
| 2015/0114894 A1* | 4/2015 | Foohey ................. B01D 35/30 210/232 |
| 2015/0114896 A1* | 4/2015 | Lam ....................... B01D 35/30 210/236 |

FOREIGN PATENT DOCUMENTS

| | | |
|---|---|---|
| JP | 2005-254103 A2 | 9/2005 |
| JP | 2009-018308 A2 | 1/2009 |
| JP | 2011-224481 A2 | 11/2011 |
| WO | WO 2007/012079 A2 | 1/2007 |

* cited by examiner

FILTERS AND FILTER ARRANGEMENTS WHICH INCLUDE A FILTER AND A MANIFOLD ASSEMBLY

DISCLOSURE OF THE INVENTION

The present invention relates to filters which remove one or more substances from a fluid, e.g., a liquid, flowing through the filter. The filter may include at least first and second fittings. For many embodiments, the first fitting may comprise an inlet fitting which receives unfiltered fluid, and the second fitting may comprise an outlet fitting which discharges filtered fluid. The filter may further include a housing and a permeable filter medium. The housing may define a fluid flow path within the housing between first and second fittings, and the permeable filter medium may be positioned in the fluid flow path within the housing. Undesirable substances, including particulates, such as solid or colloidal particles, become trapped on or within the filter medium as the fluid flows along the fluid flow path and through the permeable filter medium, thereby removing the undesirable substances from the fluid.

The present invention also relates to filter arrangements which include a filter that can be mounted to and removed from a manifold assembly. The manifold assembly, which may be part of a larger system, e.g., a processing system or a manufacturing system, may also include first and second fittings. For some embodiments, the first fitting of the manifold system may comprise a fitting for supplying unfiltered fluid from the larger system to the first fitting of the filter. The second fitting of the manifold assembly may comprise a fitting for returning filtered fluid, e.g., filtrate or permeate, from the second fitting of the filter to the larger system. The fittings of the filter and the fittings of the manifold assembly may be coupled to, and uncoupled from, one another in any of numerous ways.

In accordance with one aspect of the invention, filters for use with manifold assemblies may comprise a housing, at least first and second fittings, a permeable filter medium and a reservoir. The housing may have an upper region. The first and second fittings may be positioned on the upper region of the housing and may be sealingly engageable with first and second fittings of the manifold assembly. The housing may define a fluid flow path within the housing between the first and second fittings of the filter. The permeable filter medium may be arranged in the fluid flow path within the housing to remove one or more substances from a fluid flowing along the fluid flow path. The reservoir, which may also be positioned at the upper region of the housing, may include a wall surrounding the first and second fittings of the filter and an opening defined by the wall. The wall may have a topmost portion and each fitting of the filter may have a topmost portion, the topmost portion of each fitting being at or below the topmost portion of the wall of the reservoir.

In accordance with another aspect of the invention, filter arrangements may comprise a manifold assembly and a filter. The manifold assembly may include at least first and second fittings. The filter may include at least first and second fittings, a housing, and a permeable filter medium. The first and second fittings of the filter may be positioned on the housing, and the housing may define a fluid flow path within the housing between the first and second fittings. The permeable filter medium may be arranged in the fluid flow path within the housing to remove one or more substances from a fluid flowing along the fluid flow path. The filter may further include a reservoir mounted to the housing. The reservoir may include a wall surrounding the first and second fittings of the filter and an opening defined by the wall. The wall may have a topmost portion and each fitting of the filter may have a topmost portion, the topmost portion of each fitting being at or below the topmost portion of the wall. The first and second fittings of the manifold assembly may be sealingly engaged with the first and second fittings of the filter through the opening in the reservoir.

Filters and filter arrangements embodying the invention have many advantages. For example, many fluids filtered by the filter may be toxic, corrosive, or otherwise harmful to an operator who mounts or removes the filter to or from the manifold assembly. By providing fittings on the filter which are at or below the topmost portion of the reservoir wall, the operator is better shielded from the hazardous fluid. For example, when the fittings of the filter and the manifold are uncoupled from one another, any spray or leakage emanating from the uncoupled fittings will more likely be intercepted by the wall and trapped in the reservoir, better protecting the operator.

DESCRIPTION OF EMBODIMENTS OF THE INVENTION

Figure 1:
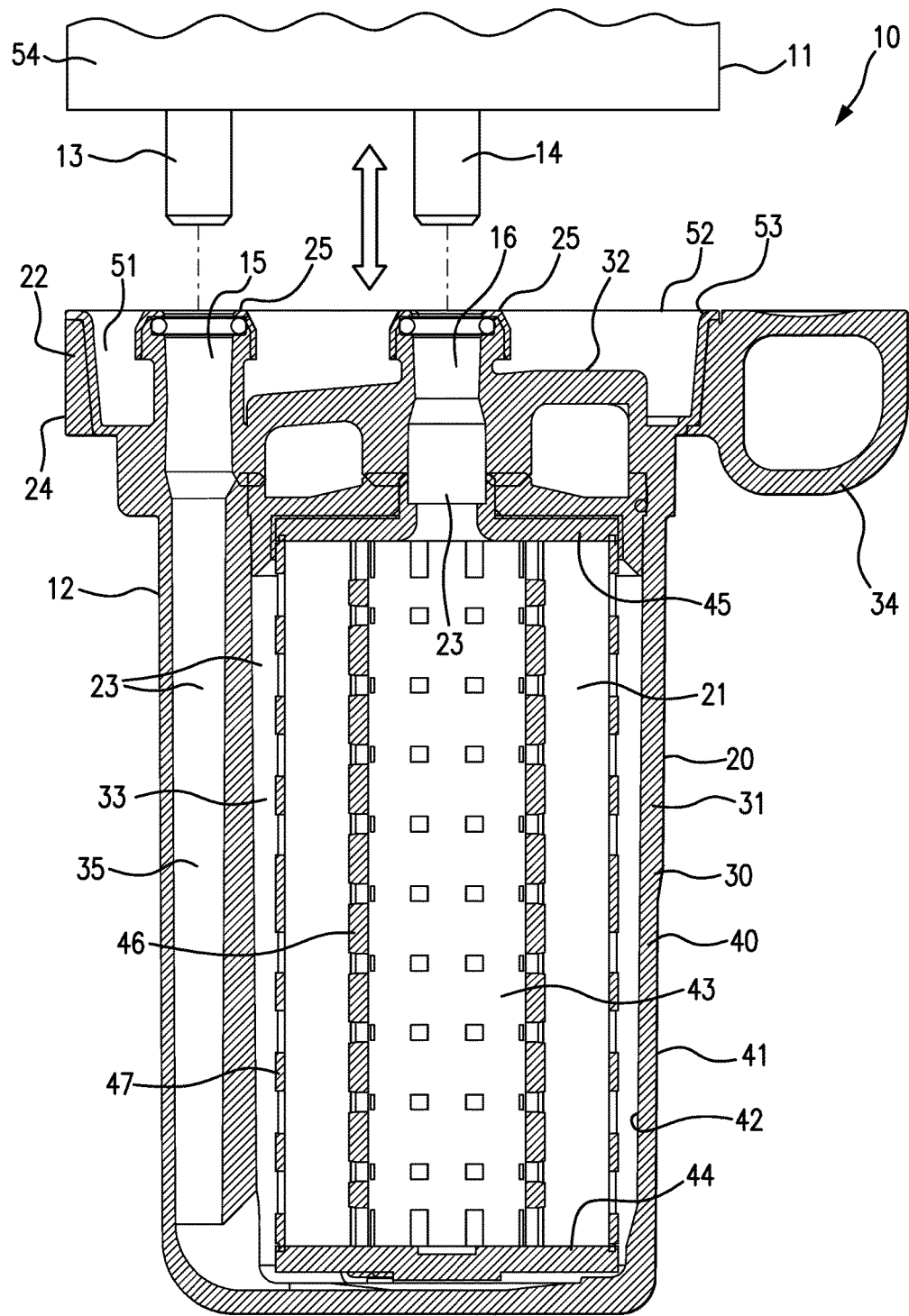
FIG. 1 is a side view of one embodiment of a filter arrangement showing the filter in cross section.

Filters and filter arrangements embodying the invention may be configured in a great variety of ways. Generally, each filter arrangement 10 may include a manifold assembly 11 and a filter 12 mountable to and removable from the manifold assembly 11, as shown in FIG. 1. The manifold assembly 11 and the filter 10 may each include at least first and second fittings 13, 14; 15, 16. The first and second fittings 13, 14 of the manifold assembly 11 may be sealingly coupled to and uncoupled from the first and second fittings 115, 16 of the filter 10, respectively.

Figure 2:
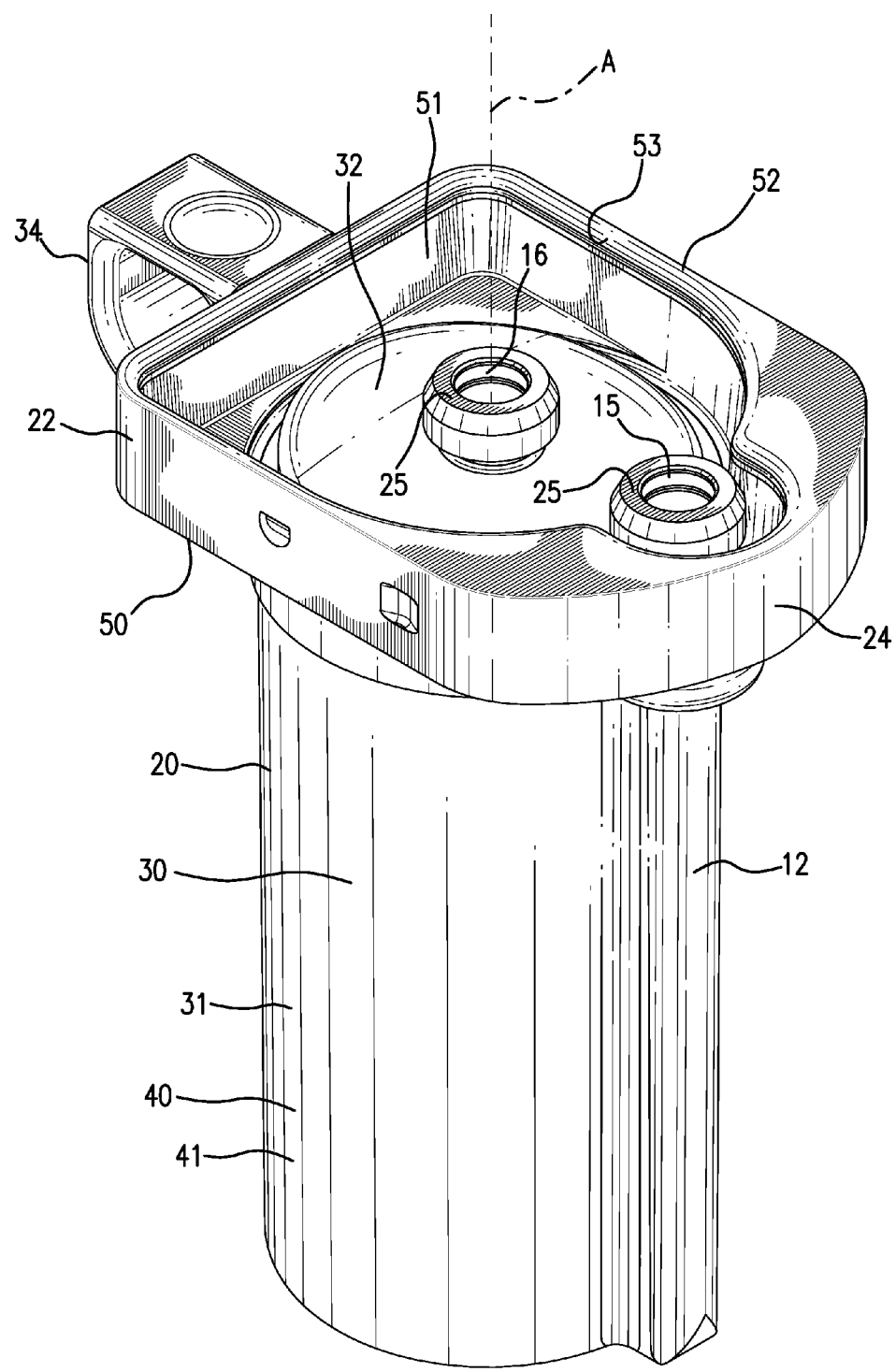
FIG. 2 is a perspective view of the filter of FIG. 1.
Figure 3:
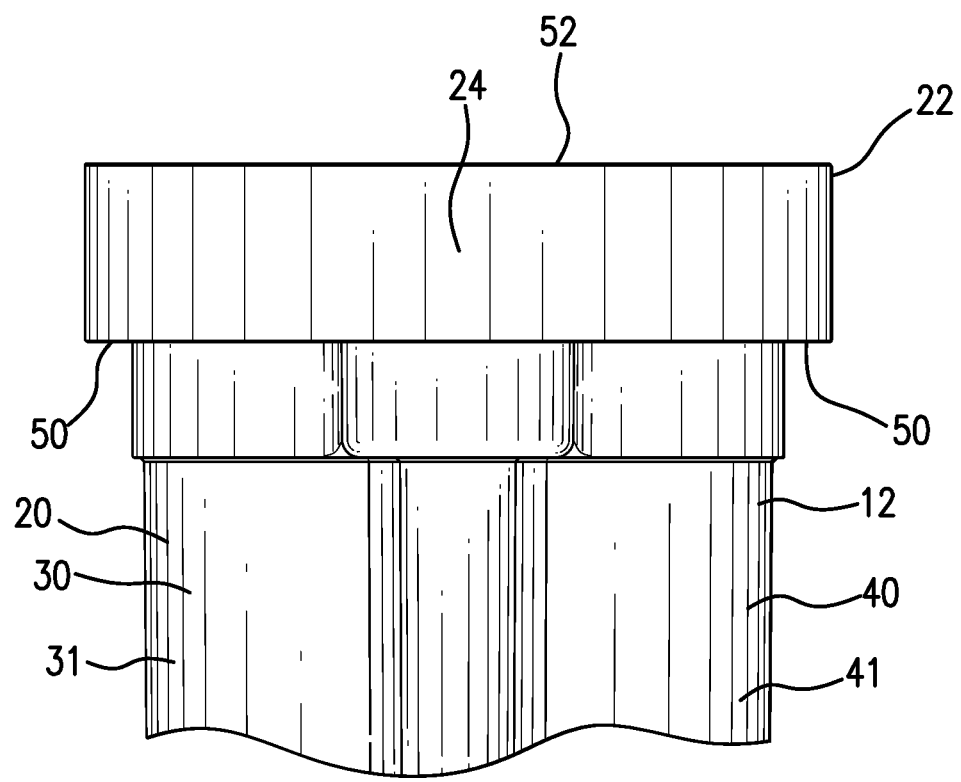
FIG. 3 is a front view of the upper region of the filter of FIG. 1.

One of many different examples of a filter 12 embodying the invention is shown in FIGS. 1-3. Generally, the filter 12 may comprise at least first and second fittings 15, 16, a housing 20, a permeable filter medium 21, and a reservoir 22. The housing 20 may define a fluid flow path 23 within the housing 20 between the first and second fittings 15, 16. The permeable filter medium 21 may be arranged within the housing 20 in the fluid flow path 23 to remove one or more substances from a fluid flowing along the fluid flow path 23. The reservoir 22 may include a wall 24 which surrounds the first and second fittings 15, 16, the reservoir 22 collecting fluid that drips or leaks from the first and second fittings 15, 16.

The first and second fittings of the filter may be variously configured. For example, the filter 12 may have only two fittings, the first fitting 15 comprising an inlet fitting for receiving unfiltered fluid, e.g., feed fluid or process fluid, and the second fitting 16 comprising an outlet fitting for discharging filtered fluid, e.g., filtrate or permeate. The filter 12 may then be arranged as a direct, dead-end or barrier filter in which all fluid entering the inlet fitting 15 passes through the permeable filter medium 21 en route to the outlet fitting 16. For some embodiments, the filter may include different and/or additional fittings. For example, the filter may include a vent fitting for venting gas from the housing. Further, the filter may be arranged as a cross-flow filter in which only a portion of the fluid entering the inlet fitting passes through the filter medium to the outlet fitting. The remainder of the fluid, e.g., the retentate or concentrate, may exit the filter via an additional retentate or concentrate outlet fitting.

The first and second fittings of the filter, as well as the first and second fittings of the manifold assembly, may be fashioned as any number of specific types of mating connectors. For some embodiments, the first and second fittings of the filter and the first and second fittings of the manifold assembly may be configured as mating nozzles and receptacles. The nozzles may be received within the receptacles and may be variously sealed within the receptacles, for example, by O-rings, gaskets, and/or face seals. Some examples of nozzles and receptacles are described in U.S. Pat. No. 7,807,055, which is incorporated by reference. In the illustrated embodiment, the first and second fittings 15, 16 of the filter 12 may each comprise a receptacle, while the first and second fittings 13, 14 of the manifold assembly 11 may each comprise a nozzle. Alternatively, one or both of the filter fittings may comprise a nozzle and one or both of the manifold assembly fittings may comprise a receptacle, or the filter and manifold assembly fittings may comprise any other type of fitting.

The first and second fittings of the filter may be positioned at a variety of locations on the housing. For many embodiments, the first and second fittings 15, 16 may be positioned in an upper region of the housing 20, e.g., on top of the housing 20. Each fitting 15, 16 may terminate at a topmost portion 25 and may extend above the top of the housing 20. Alternatively, one or both fittings may be embedded in the top of the housing, wherein the topmost portion of the fitting is at or below the top of the housing.

The housing may be configured in any of numerous ways. For example, the housing may have any of a variety of irregular shapes or regular shapes, including a generally cylindrical shape. The housing may be openable, allowing a fouled permeable filter medium to be removed from the interior of the housing and cleaned or replaced. For example, the housing may include a bowl and a header, cover, and/or base removably attached to the bowl in any of a variety of ways. Alternatively, the housing may be permanently closed with the permeable filter medium permanently sealed inside the housing. Once the filter medium becomes fouled, both the housing and the permeable fitter medium may be replaced together as a single unit. In addition, the housing may be fashioned from a variety of impermeable materials, including metals, such as stainless steel, and polymers, such as polypropylene or high density polyethylene (HDPE).

One of many different examples of a housing 20 is shown in FIGS. 1-3. The housing 20 may include a longitudinal axis A and may comprise a body 30 which may be configured in any of numerous ways. For some embodiments, the body 30 may comprise a bowl 31 and a cover 32. The cover 32 may be removably or permanently attached to the top of the bowl 31 and may form the top of the housing 20. The interior of the housing 20, e.g., the interior of the body 30 or bowl 31, may define a filter chamber 33. The filter chamber 33 may comprise a portion of the fluid flow path 23, and the permeable filter medium 21 may be positioned in the filter chamber 33, for example, across the fluid flow path 23. For some embodiments, the filter 12 may also include a finger hold 34 to facilitate manipulation of the filter 12 by an operator.

The first and second fittings may fluidly communicate with the filter chamber in a variety of ways to direct fluid along the fluid flow path through the filter chamber. For example, both fittings may be positioned on top of the body, e.g., on or in the cover, and may open through the body, e.g., through the cover, into the top of the filter chamber. For some embodiments, at least one fitting, e.g., the inlet fitting 15, may be positioned on top of the housing 20 to open into a fluid conduit 35 in the body 30, e.g., in the bowl 31. The fluid conduit 35 may direct fluid from the top of the housing 20 toward the bottom of the housing 20 outside of the filter chamber 33. The fluid conduit 35 may open into the filter chamber 33 at or near the bottom of the filter chamber 33, while the outlet fitting 16 may open through the top of the housing 20, e.g., through the cover 32, into the top of the filter chamber 33. This arrangement may facilitate the clearance of gas, e.g., air, or preconditioning or preservative liquid from the filter chamber and the remainder of the fluid flow path as the housing fills with fluid.

For many embodiments, the housing may also include a single-walled pressure vessel capable of withstanding the difference in pressure between the ambient pressure at the exterior of the housing and the fluid operating pressure in the interior of the housing, e.g., within the filter chamber. The single-walled pressure vessel may also define the filter chamber. For example, the housing 20, e.g., the body 30 or the bowl 31, may have a single wall 40 separating the ambient environment from the filter chamber and serving as a pressure vessel. The exterior 41 of the pressure vessel wall 40 may contact the ambient environment. The interior 42 of the pressure vessel wall may define at least a portion of the outer periphery of the filter chamber 33 and may contact fluid flowing within the filter chamber 33. The pressure vessel wall 40 may be formed from a metal or a polymer, and the thickness of the wall may vary depending on factors such as the material of construction and the desired fluid operating pressure. Generally, the wall is arranged to have sufficient structural integrity to withstand the difference in pressure between the ambient pressure and the fluid operating pressure. For many embodiments, this pressure differential may be about 100 psid. (6.9 bard) or less and for a metal wall the thickness may be about 0.065 inch (1.7 mm) or less while for a polymeric wall the thickness may be about 0.25 inch (6.4 mm) or less.

The permeable filter medium may be configured in any of numerous ways. For example, the permeable filter medium may comprise a pleated or spirally-wound permeable sheet having one or more layers, including a fitter medium layer, one or more drainage and/or support layers, and/or a cushioning layer. Alternatively, the permeable filter medium may comprise a bundle of permeable hollow fibers or a permeable mass, e.g., a hollow cylindrical permeable mass. The filter medium may be formed from any of numerous materials, including, but not limited to, any of various polymeric materials, and may be fashioned, for example, as a woven or nonwoven sheet, a mesh, or a mass of filaments or fibers or as a permeable membrane, e.g., in the form of a sheet or hollow fibers. The permeable filter medium may have a wide range of filtration characteristics. For example, the permeable filter medium may be porous, permeable, semipermeable, or permselective, and the removal rating may be in the range from microporous or coarser to ultraporous, nanoporous, or finer.

For many embodiments, the permeable filter medium may be a portion of a filter element that may be permanently or removably mounted in the housing, e.g., in the filter chamber. The filter element may be configured in any of a variety of ways. For example, as shown in FIG. 1, the permeable filter medium 21 may be a portion of a hollow filter element 43 additionally comprising a blind end cap 44 and an open end cap 45 capping opposite axial ends of the fitter medium 21. The open end cap 45 may include an opening that fluidly communicates between the hollow interior of the filter element 43 and the outlet fitting 16. A perforated core 46 and a perforated cage 47 may be positioned around the interior and exterior of the permeable filter medium 21 to support the filter medium 21 against radially directed forces.

The reservoir may be positioned around the top of the housing in a variety of ways. For example, the reservoir may be mounted to an upper region of the housing, i.e., the upper half of the body of the housing, and may extend axially upwardly at the top of the housing. Further, the reservoir, including the wall of the reservoir, may be configured in any of numerous ways. The wall of the reservoir may comprise one or more walls which surround the first and second fittings of the filter individually or collectively and define one or more openings that allow the fittings of the filter and the fittings of the manifold assembly to be sealingly coupled to and uncoupled from one another. As one of many examples, the wall of the reservoir may comprise an annular collar which extends axially upwardly around the top of the housing and surrounds the first and second fittings of the filter collectively. The fittings of the fitter and the manifold assembly may couple to and uncouple from one another through a circular opening defined by the topmost portion of the collar.

As another example, the wall 24 of the reservoir 22 in the illustrated embodiment may comprise a flange. The flange 24 may be mounted to the upper region of the housing 20, e.g., on the top of the housing 20. The flange may have any irregular shape or a regular shape, e.g., a generally circular, oval, or rectangular shape. At least a portion of the flange 24 may extend outwardly from the body 30 of the housing 20 laterally, e.g., in a direction generally perpendicular to the longitudinal axis A of the housing 20. For some embodiments, the outwardly extending portion of the flange 24 may define one or more ledges 50 that face axially downwardly toward the bottom of the housing 20 and extend in a plane generally perpendicular to the longitudinal axis A, for example, on opposite sides of the housing 20. The flange 24 may then serve as a mechanism for mechanically mounting the filter 12 to the manifold assembly 11 and supporting the filter 12 on the manifold assembly 11, e.g., by resting the ledges 50 on correspond supporting surfaces on the manifold assembly 11. The flange 24 may also define a basin 51 and may surround the first and second fittings 15, 16 of the filter 12 collectively, the first and second fittings 15, 16 extending axially upwardly from the top of the housing 20, e.g., from the cover 32, within the basin 51. The topmost portion 52 of the reservoir wall 24, e.g., the topmost portion 52 of the flange 24, may define an opening 53 allowing the filter fittings 15, 16 to be sealingly coupled to or uncoupled from the fittings 13, 14 of the manifold assembly 11.

Although the reservoir, including the wall, may be variously configured, the topmost portion of the reservoir wall is no lower than the topmost portion of each of the first and second fittings of the filter. In other words, the topmost portion of each of the first and second fittings of the filter is no higher than, i.e., is at or below, the topmost portion of the reservoir wall. For example, as shown in FIGS. 1 and 3, the topmost portion of each of the first and second fittings 15, 16 of the filter 12 is no higher than, i.e., does not extend axially beyond, the topmost portion 52 of the reservoir wall 24, e.g., the flange. Although the topmost portion 25 of the first and second filter fittings 15, 16 may be below the topmost portion 52 of the reservoir wall 24, in the illustrated embodiment, the topmost portion 25 of each fitting 15, 16 is at the same level as the topmost portion 52 of the reservoir wall 24. With the topmost portion 52 of the reservoir wall 24 at or above the topmost portion 25 of each filter fitting 15, 16, any fluid that leaks or spews from the fittings 13, 14; 15, 16 as they are sealingly coupled or uncoupled will more likely be intercepted by the reservoir wall 24 and collected in the reservoir 22, e.g., in the basin 51 of the flange 24.

The manifold assembly may also be configured in a great variety of ways. Generally, the manifold assembly may include a body, and the manifold body may be variously structured, e.g., may have any irregular or regular shape. The manifold body may support at least the first and second fittings of the manifold assembly. For many, but not all, embodiments the first manifold fitting may comprise a feed or process fluid fitting for supplying unfiltered fluid, e.g., feed or process fluid, from a larger system to the inlet fitting of the filter, while the second manifold fitting may comprise a filtrate or permeate fitting for returning filtered fluid, e.g., filtrate or permeate, from the outlet fitting of the filter to the larger system. Different and/or additional fittings, such as avert fitting or a retentate or concentrate fitting, may also be supported by the manifold body. The fittings of the manifold assembly may be fashioned as any number of specific types of connectors, including, nozzles and mating receptacles which receive the nozzles, as previously described. Further, valves may be associated with some or all of the manifold fittings to control fluid flow through the fittings. The valves may be mounted to the manifold assembly, e.g., to the manifold body, or may be external to the manifold assembly, e.g., may be part of the larger system.

One of many different examples of a fitter arrangement 10 having a manifold assembly 11 is shown in FIG. 1. The manifold assembly 11 may include a manifold body 54 which supports first and second manifold fittings 13, 14. The first and second manifold fittings 13, 14 may be sealingly coupled to and uncoupled from the first and second filter fitting 15, 16, receptively, in any of various ways. For example, the manifold body 54 may remain stationary while the filter 12 is lifted and mounted to, or pulled and removed from, the manifold body 54 manually by an operator. At the same time the filter 12 is mounted to or removed from the manifold assembly 11, the fittings 15, 16 of the filter 12 are sealingly coupled to or uncoupled from the fittings 13, 14 of the manifold assembly 11. While it is mounted to the manifold assembly 11, the filter 12 may be mechanically secured to the manifold assembly 11 in any of a variety of ways, e.g., by spring clips (not shown) which hang from the manifold body 54 and clip under the ledges 50 on the flange 24 of the filter 12.

In other embodiments, the manifold assembly may include a moveable portion which moves the first and second fittings of the manifold assembly and the first and second fittings of the filter relative to one another to sealing couple or uncouple the fittings. For example, for some embodiments the first and second manifold fittings may be supported on the moveable portion of the manifold assembly, while the filter is held stationary, e.g., mounted to a stationary portion of the manifold assembly. With the filter mounted to the stationary portion of the manifold assembly, the moveable portion of the manifold assembly may move the manifold fittings into and out of sealing engagement with stationary filter fittings, thereby sealingly coupling and uncoupling the fittings.

For some embodiments, the moveable portion of the manifold assembly may be the portion of the manifold assembly which holds the filter. A filter arrangement which includes a manifold assembly having a moveable portion that holds the filter and moves the filter fittings into and out of sealing engagement with the manifold fittings may be configured in a great variety of ways. The filter arrangement 10 shown in FIGS. 4-10 is but one of many examples.

Figure 4:
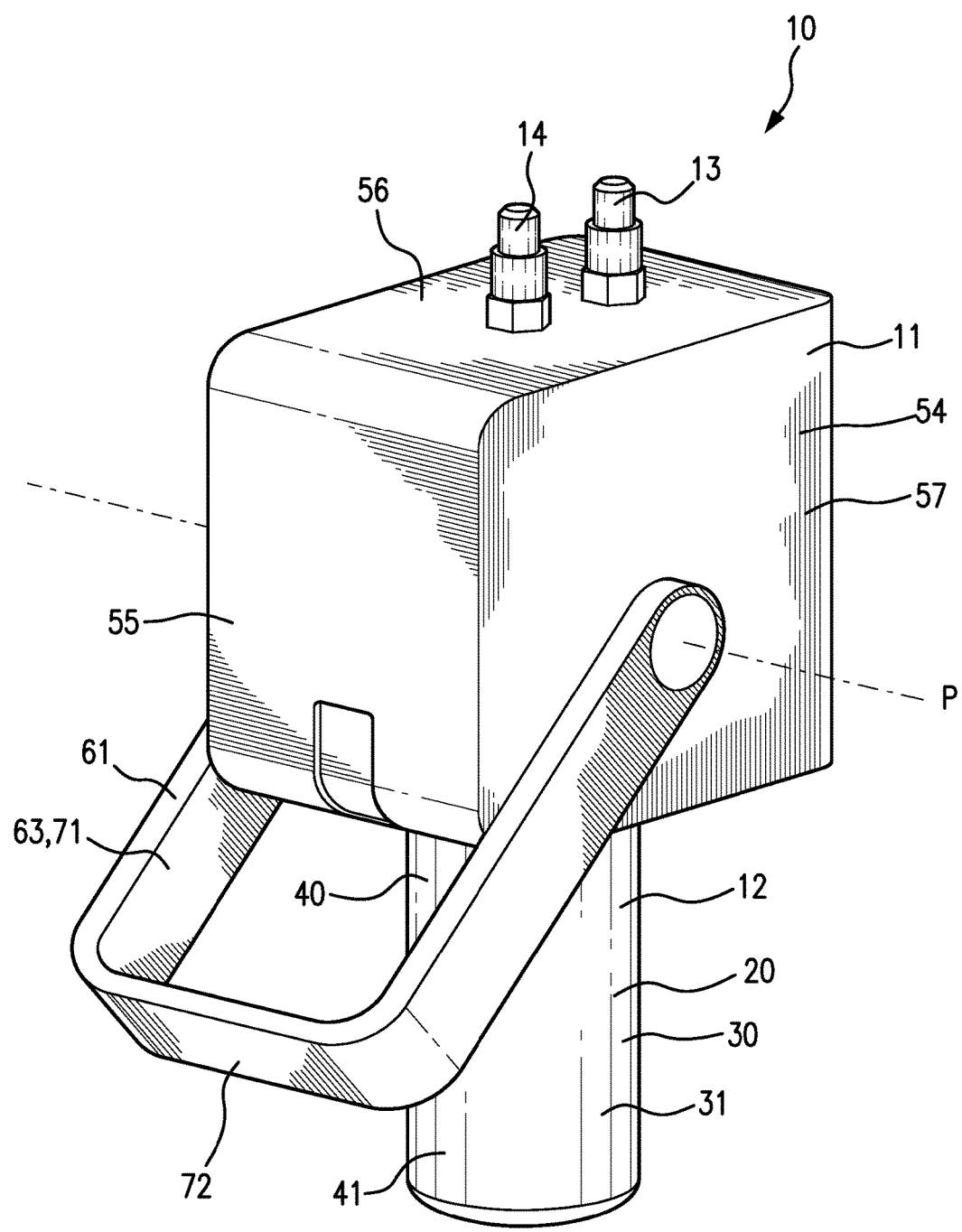
FIG. 4 is a perspective view of another embodiment of a filter arrangement showing the manifold assembly and the filter mounted to the manifold assembly.
Figure 5:
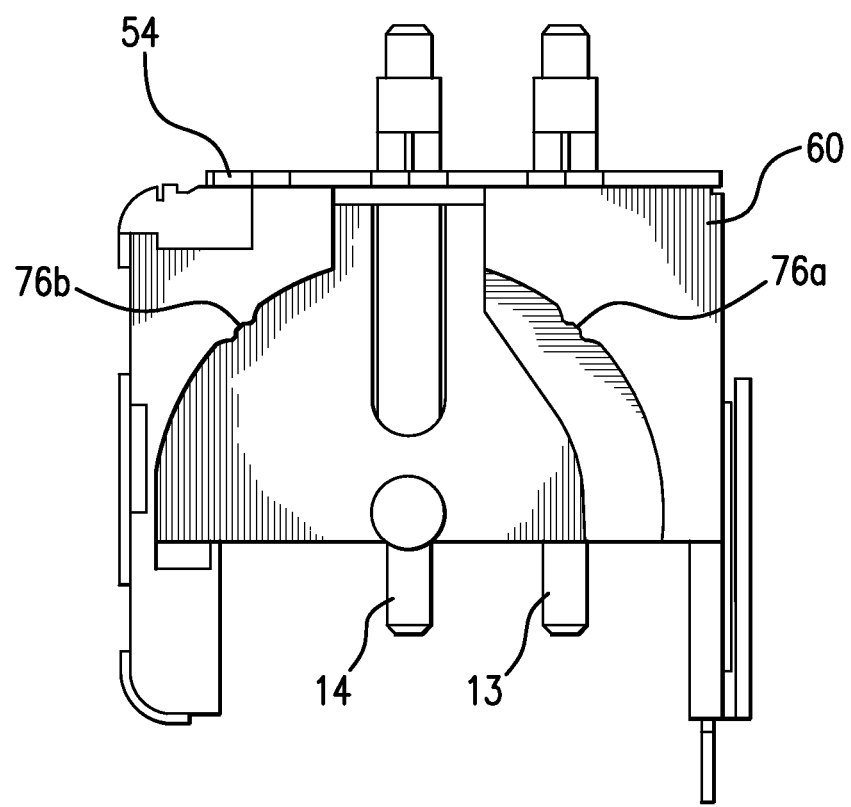
FIG. 5 is a side view of the inner shell of the filter arrangement of FIG. 4.
Figure 6:
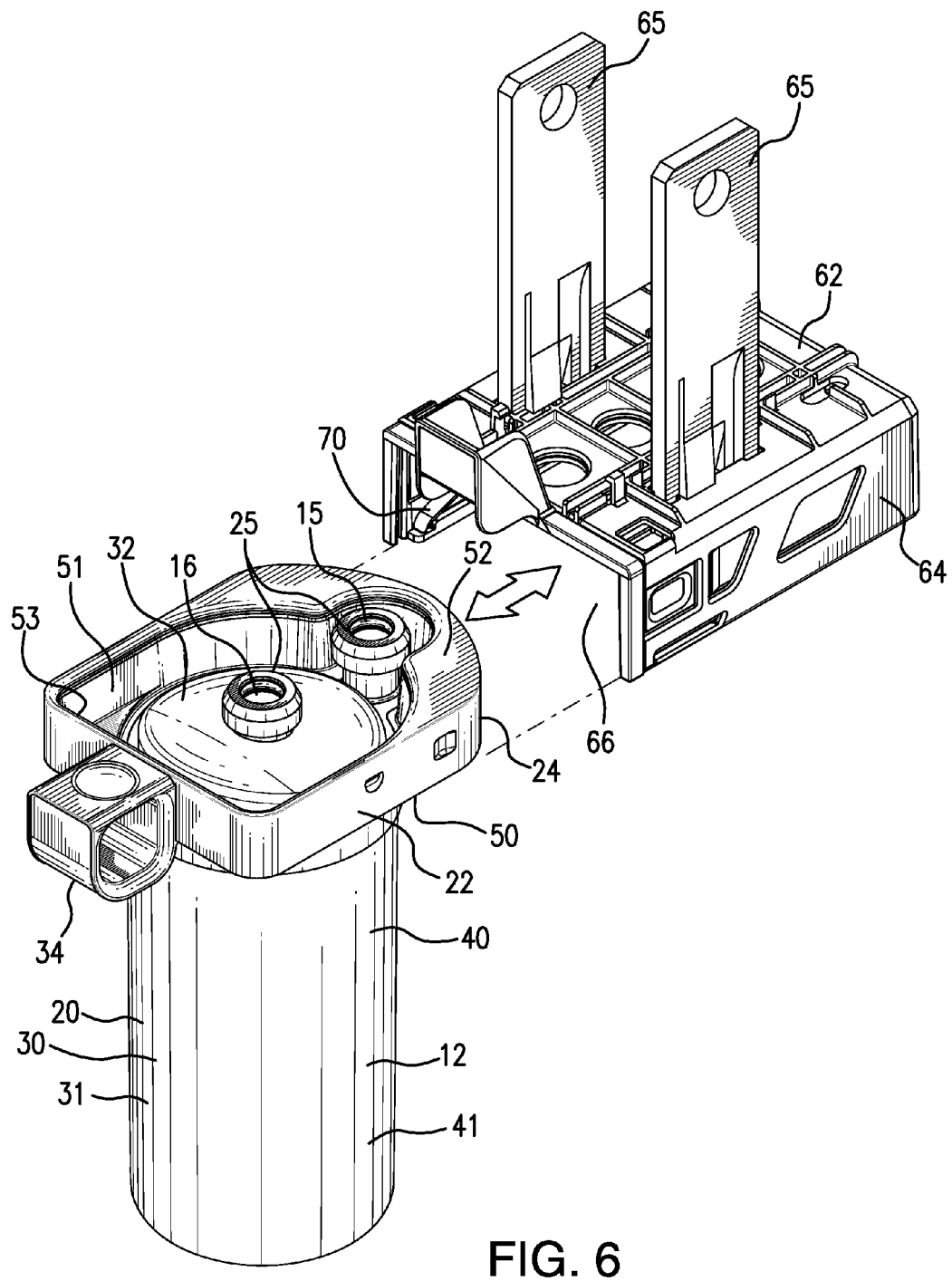
FIG. 6 is a perspective view of the filter and the carriage assembly of the filter arrangement of FIG. 4.
Figure 7:
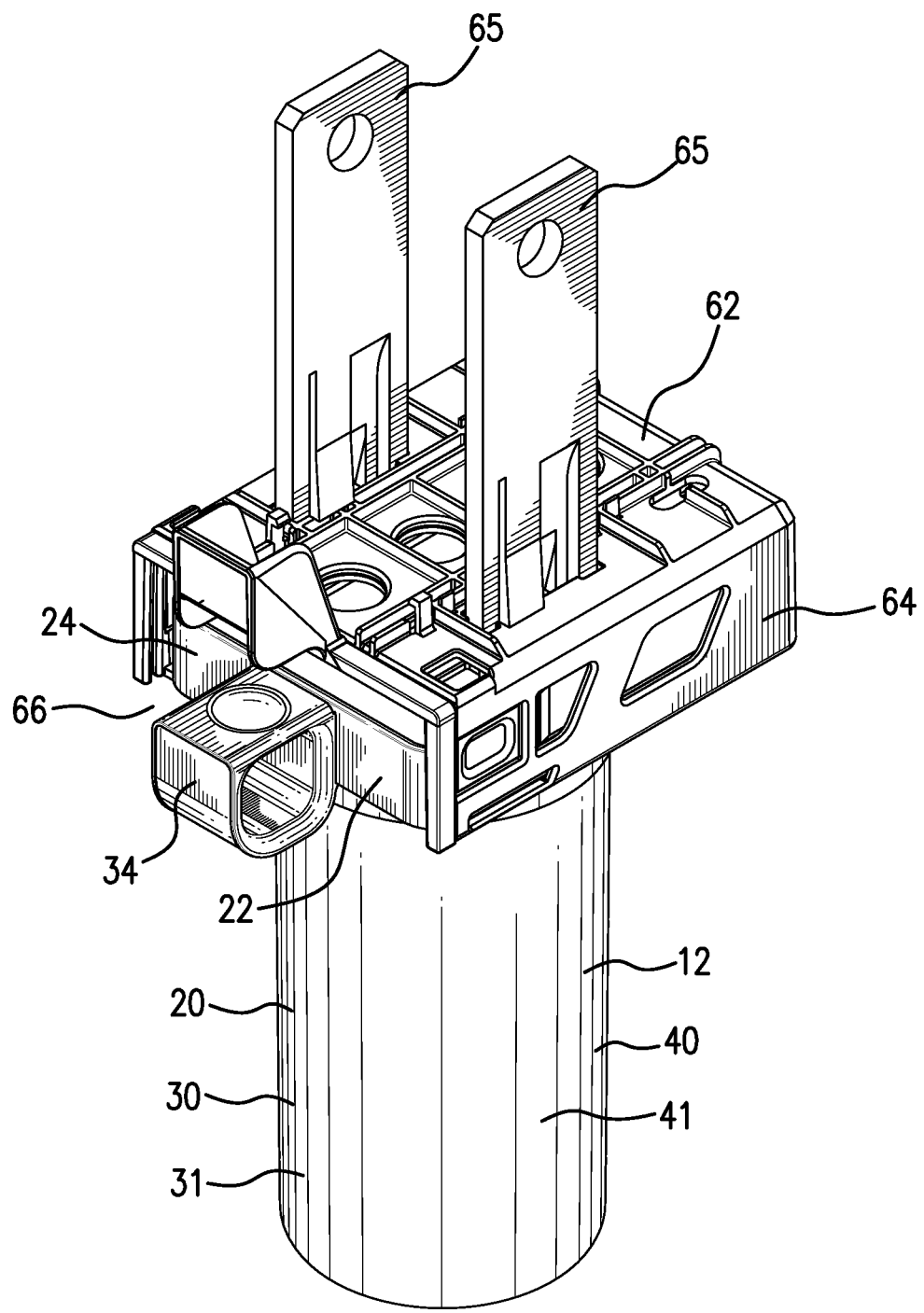
FIG. 7 is a perspective view of the filter mounted to the carriage assembly of the filter arrangement of FIG. 4.

As shown in FIGS. 4 and 5, the manifold body 54 may include front, top, and opposite side plates 55, 56, 57 connected to an inner shell 60 which may support at least the first and second manifold fittings 13, 14. The first and second manifold fittings 13, 14 may extend through the inner shell 60 and may be coupled at one end, e.g., the upper end, to a larger system (not shown) and, at the other end, e.g., the lower end, may be sealingly coupleable to the first and second filter fittings 15, 116, respectively. The manifold body 54 including the inner shell 60 and the manifold fittings 13, 14, may remain stationary.

The manifold assembly may also include a moveable shuttle assembly, and the moveable shuttle assembly may have any number of different configurations. For some embodiments, including the embodiment shown in FIGS. 4-10, the shuttle assembly 61 may include a carriage assembly 62 and an actuator mechanism 63 coupled to the carriage assembly 62. Either or both of the carriage assembly 62 and the actuator mechanism 63 may be coupled to the manifold body 54. The carriage assembly 62, which receives the filter 12, may move the filter fittings 15, 16 into and/or out of sealing engagement with the manifold fittings 13, 14 in response to movement of the actuator mechanism 63. In other embodiments, the moveable shuttle assembly may comprise a carriage assembly coupled to the manifold body without an actuator mechanism. For example, the carriage assembly may be hinged to the manifold body. The carriage assembly may then move the filter fittings into and/or out of engagement with the manifold fittings by directly pivoting the carriage assembly.

The carriage assembly may be variously configured. As one of many examples, the carriage assembly 62 may include a carriage 64 and one or more, e.g., two, lifts 65 attached to and extending beyond, e.g., upwardly from, the carriage 64, as shown, for example, in FIGS. 6 and 7. Each lift 65 may be mounted in a track which extends longitudinally along the inside of the inner shell 60 of the manifold body 54, the tracks limiting the movement of the lifts 65 to longitudinal movement, e.g., axially up and down, along the tracks. The carriage and the filter may be configured in any of numerous ways to allow the carriage to receive and support the fitter for movement. As one of many examples, the illustrated carriage 64 may have an open end 66 which receives the filter 12 and shelves 70 in the interior on both sides of the carriage 64 for supporting the filter 12. The ledges 50 on the housing 20 may slide along and rest on the shelves 70 of the carriage 64. The filter may be positioned on the moveable shuttle assembly in a variety of ways. For example, the filter 12 may be inserted in the carriage 64 by sliding the flange 24 into the open end 66 of the carriage 64, the ledges 50 of the flange 24 sliding along and being supported by the shelves 70. The finger hold 34 may facilitate inserting, and withdrawing, the filter 12 into or out of the carriage 64. The top of the flange 24 may be positioned close to the top of the carriage 64. When the shuttle assembly 61 moves the filter fittings 15, 16 into or out of engagement with the manifold fittings 13, 14, the shelves 70 of the carriage 64 may exert an upward force on the ledges 50 of the filter 12 to engage the fittings 13, 14; 15, 16 and the top of the carriage 64 may exert a downward force on the top of the flange 24 to disengage the fittings 13, 114; 15, 16.

Once the filter is positioned on the carriage assembly, the actuator mechanism may be actuated to move the filter on the carriage assembly and sealingly couple or uncouple the filter fittings and the manifold fittings. For example, the actuator mechanism may be moved from a first position to a second position. In response to this movement, the carriage assembly and any filter on the carriage assembly may be moved from a first position, wherein the filter fittings are spaced from and disengaged with the manifold fittings, to a second position, wherein the filter fittings sealingly engage the manifold fittings. When the fittings of the filter and the manifold assembly are sealingly engaged, the topmost portion of the wall of the reservoir, e.g., the topmost portion of the flange, may or may not contact, and may or may not seal against, the bottom of the manifold body. To disengage the filter fittings from the manifold fittings, the actuator mechanism may be moved from the second position to the first position, thereby moving the carriage assembly and the filter from the second position, wherein the filter fittings sealingly engage the manifold fittings, to the first position, wherein the filter fittings are disengaged and spaced from the manifold fittings. For some embodiments, including the illustrated embodiment, the carriage assembly and the actuator mechanism may be arranged to move the filter fittings linearly and coaxially with respect to the manifold fittings the entire distance that the fittings travel between the first position and the second position of the carriage assembly. For other embodiments, the filter fittings and the manifold fittings may move in a different manner, e.g., in an arcuate manner relative to one another between the first and second positions.

The actuator mechanism may be variously configured to move the carriage assembly. For example, the actuator mechanism may comprise a threaded arrangement or a cammed arrangement that may move the carriage assembly between the first and second positions in response to movement of the actuator mechanism. For some embodiments, the actuator mechanism may comprise a pivotable lever arrangement that may be pivoted between first and second positions to move the carriage assembly between the first and second positions.

Figure 8:
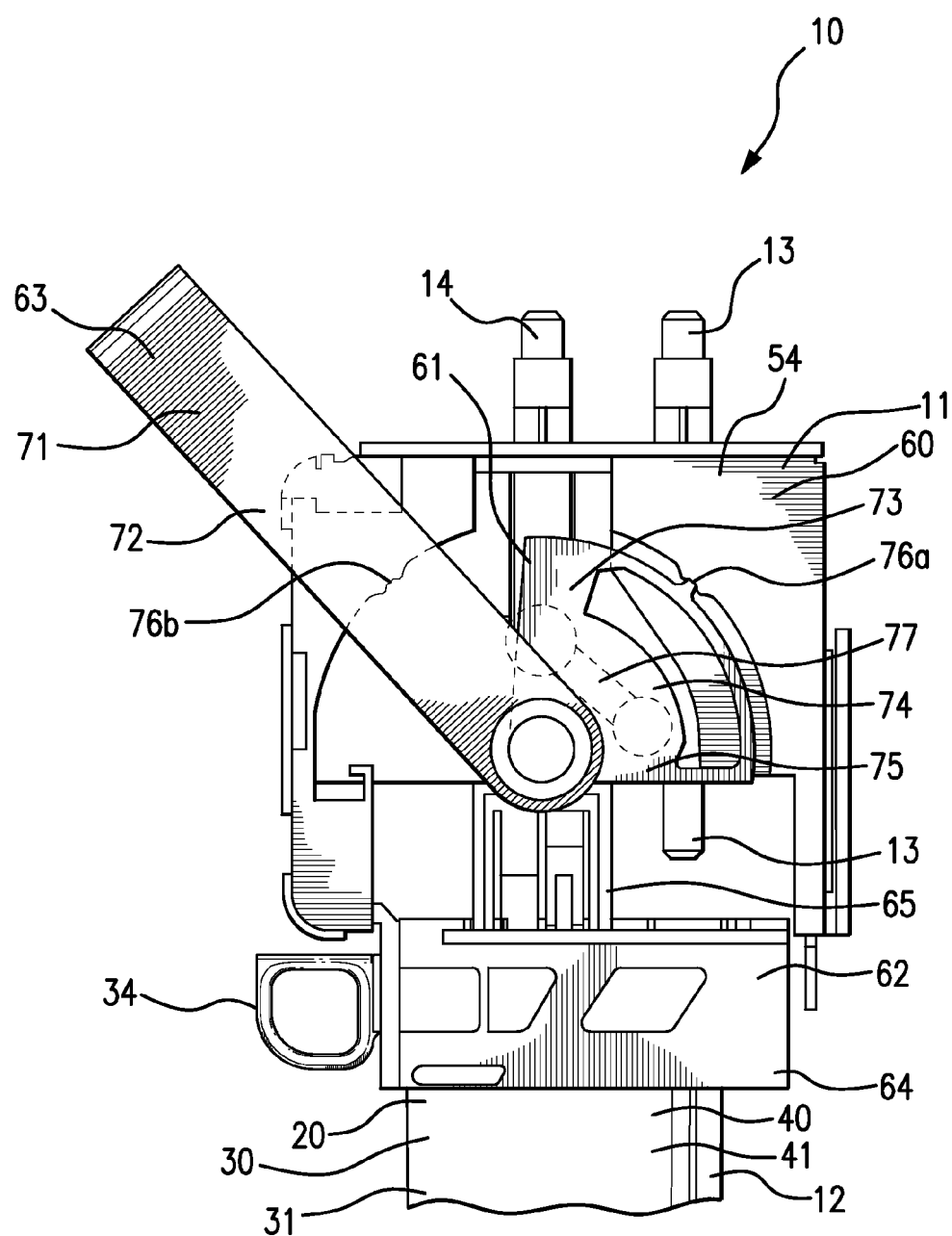
FIGS. 8-10 are side views of the inner shell, the moveable shuttle assembly, and the filter of the filter arrangement of FIG. 4.
Figure 9:
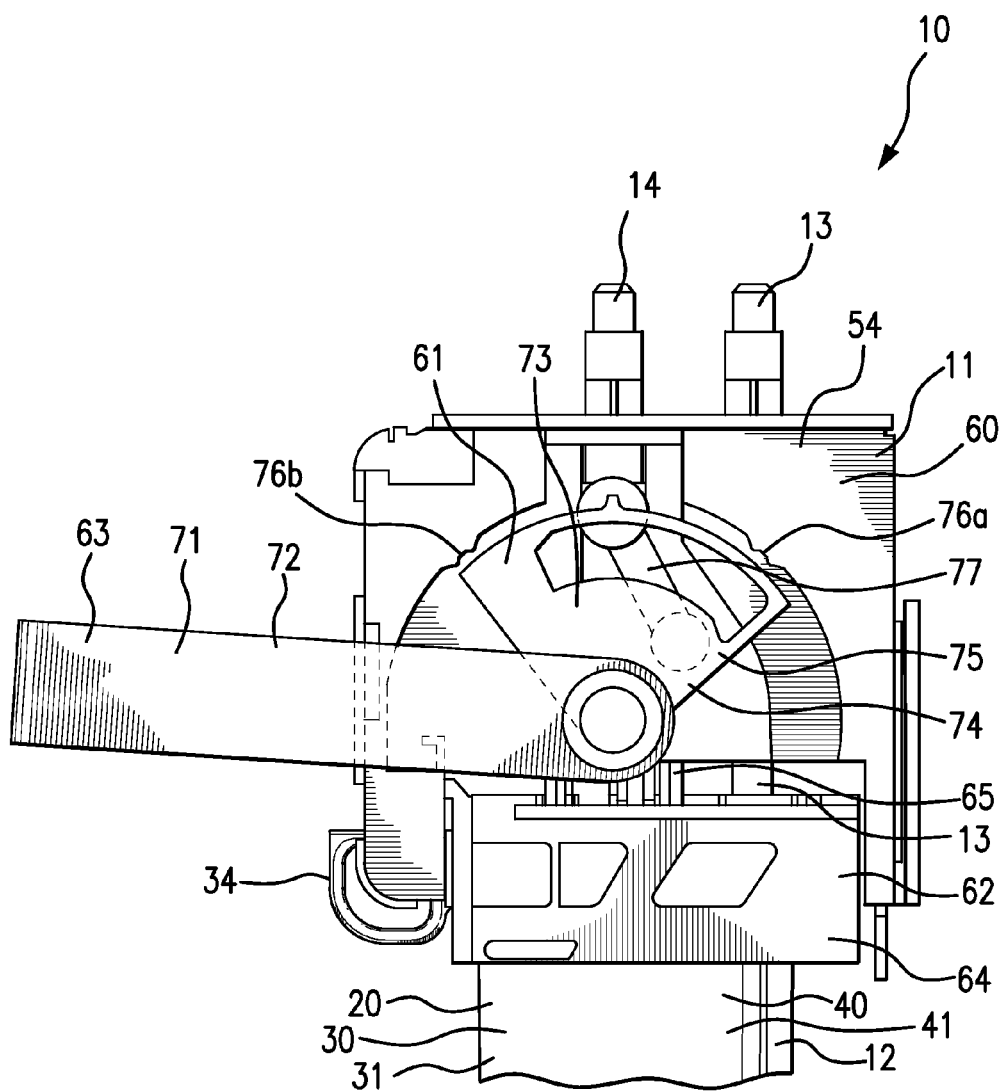
Figure 10:
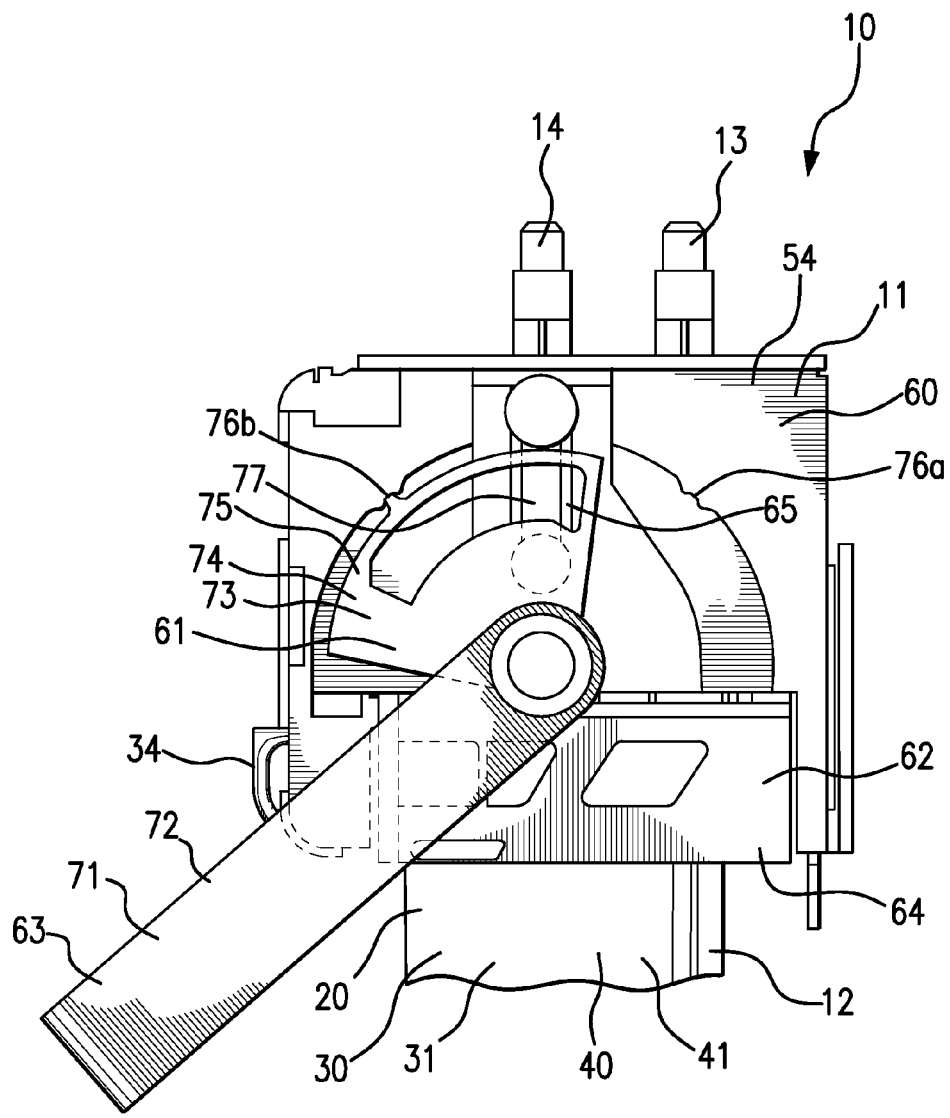

The pivotable lever arrangement may be configured in numerous ways. For example, the actuator mechanism 63 may comprise a pivotable lever arrangement 71 which, as shown in FIGS. 8-10, may include a pivotable lever 72 mounted, for example, to the manifold body 54 and a linkage 73 linking the pivotable lever 72 to the carriage assembly 62. Both the pivotable lever and the linkage may be configured in a variety of ways. In the illustrated embodiment, the pivotable lever 72 may comprise a handle, e.g., a U-shaped handle. Each end of the U-shaped handle 72 may be pivotably mounted to the manifold body 54, e.g., to the inner shell 60, and the handle 72 may be pivoted about a pivot axis P between a first position, e.g., a 10:30 position as shown in FIG. 8, and a second position, e.g., a 7:30 position as shown in FIG. 10. The linkage 73 may, for example, comprise a crank assembly 74 coupled between the handle 72 and the carriage assembly 62 on each side of the manifold body 54, e.g., on each side of the inner shell 60. For some embodiments, each crank assembly 74 may include a crank link 75 which pivots with the handle 72. For example, the crank link 75 may be fixedly mounted to an end of the handle 72 at the pivot axis P, the crank link 75 pivoting with the handle 54 about the pivot axis P between the first and second positions. The handle 72, along with the remainder of the actuator mechanism 63, may be held in the first and second positions by detents 76a, 76b mounted, for example, between the inner shell 60 and the crank link 75. Each crank assembly 74 may further include a slider link 77 rotatably mounted at one end to fixed location on a lift 65. For example, one end of the slider link 77 may be rotatably mounted within an aperture in an upper region of the lift 65. The other end of the slider link 77 may be rotatably mounted to a fixed location on the crank link 75 off set or spaced from the pivot axis P, As the handle 72 pivots between the first position and the second position, the crank links 75 on each side of the inner shell 60 also pivot between a first position and a second position, as shown in FIGS. 8-10. Pivoting the crank links 75 between the first and second positions moves the slider links 77 which, in turn, drives the lifts 65 longitudinally, e.g., axially up or down, along the tracks of the inner shell 60. The lifts 65, in turn, move the carriage 64 and any filter 12 on the carriage 64 longitudinally, e.g., axially up or down, sealingly coupling or uncoupling the filter fittings 15, 16 and the manifold fittings 13, 14. Thus, moving the actuator mechanism 63 from a first position to a second position, e.g., pivoting the lever or handle 72 from a first position to a second position, moves the carriage assembly 62 and any filter 12 in the carriage assembly 62 from a first position, in which the carriage 64 is spaced from the manifold body 54 and the filter fittings 15, 16 are disengaged and spaced from the manifold fittings 13, 14, to a second position, in which the carriage 64 is nestled closer to the manifold body 54 and the filter fittings 15, 16 are sealingly engaged with the manifold fittings 13, 14. Similarly, moving the actuator mechanism 63 from the second position to the first position, e.g., pivoting the lever or handle 72 from the second position to the first position, moves the carriage assembly 62 and any filter 12 on the carriage assembly 62 from the second position, in which the carriage 64 is nestled closer to the manifold body 54 and the fitter fittings 15, 16 are sealingly engaged with the manifold fittings 13, 14, to the first position, in which the carriage 64 is spaced from the manifold body 54 and the filter fittings 15, 16 are disengaged and spaced from the manifold fittings 13, 14.

Figure 11:
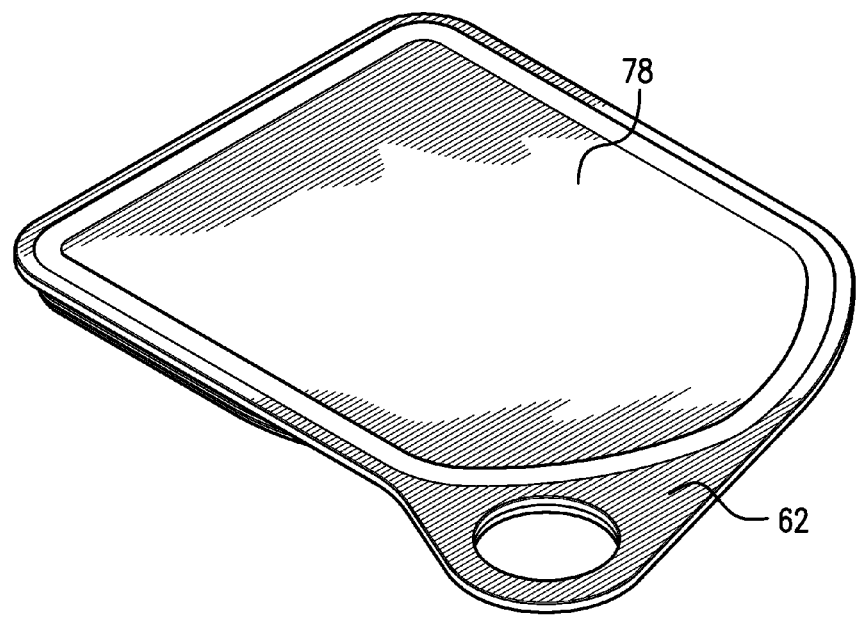
FIGS. 11 and 12 are top and bottom perspective views of the cap for the filter of FIGS. 1 and 4.
Figure 12:
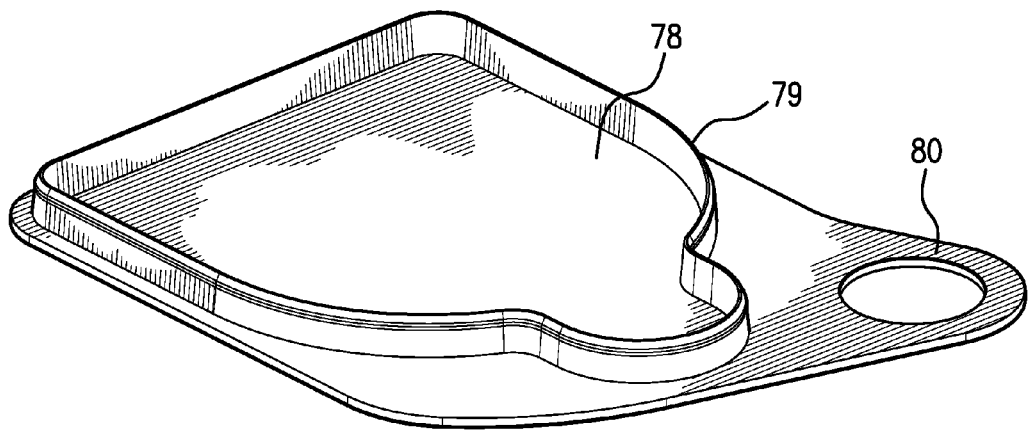

Some embodiments of the filtration arrangement may include a cap that may be attached to the filter to cover the reservoir and isolate any fluid in the reservoir or the filter once the filter is uncoupled and removed from the manifold assembly. The cap may be formed from any of a variety of impervious materials, including, for example, an impervious polymeric or elastomeric material. Further, the cap may be configured in any of numerous ways. Because the topmost portion of the reservoir, e.g., the topmost portion of the flange, is at or above the topmost portion of the filter fittings, the cap may be generally flat, as shown in FIGS. 11 and 12, to facilitate stacking and storage of the filters. The cap may be attachable to the housing or the reservoir of the filter in any of numerous ways. For example, the cap 78 may be threaded or snap-fit to the reservoir 22, e.g., to the wall 24 of the reservoir 22. For some embodiments, the cap 78 may include a lip 79 on the underside of the cap 78 that may be snap-fit to the wall 24 of the reservoir 22, e.g., at the opening 53 of the wall 24, securely containing or even seating any fluid within the reservoir 22. The cap 78 may also be arranged to contact and fit tightly over the fittings 15, 16 of the filter 12 or may include projections that extend into and seal off the fittings to even better prevent any spillage from the filter 12. For some embodiments, the cap 78 may also include a finger pull 80 allowing the cap 78 to be more easily removed from the filter 12.

The present invention thus encompasses innumerable embodiments and is not restricted to the particular embodiments that have been described, illustrated, and/or suggested herein. Rather, the present invention includes all embodiments and modifications that may fall within the scope of the claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "for example," "such as," and "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter for use with a manifold assembly, the filter comprising a housing, first and second fittings, a fluid conduit, and a permeable filter medium, wherein the housing has a longitudinal axis, an interior defining a filter chamber, an upper region, a top, and a bottom, and wherein the first and second fittings extend axially upwardly from the top of the housing and terminate at a topmost portion and are sealingly engagable with first and second fittings of a manifold assembly, the housing defining a fluid flow path within the housing between the first and second fittings of the filter, wherein the permeable filter medium is arranged in the filter chamber in the fluid flow path within the housing to remove one or more substances from a fluid flowing along the fluid flow path, the filter further comprising a reservoir positioned at the top of the housing, wherein the reservoir includes a wall comprising a flange, at least a portion of the flange extending outwardly beyond the housing in a direction generally perpendicular to the longitudinal axis, the outwardly extending portion of the flange defining one or more ledges that face downwardly toward the bottom of the housing, the flange surrounding the first and second fittings collectively and further defining a basin, the wall having a topmost portion and each of the first and second fittings having a topmost portion, and wherein the topmost portion of each of the first and second fittings is at or below the topmost portion of the wall of the reservoir, and the first fitting comprises an inlet fitting opening into the fluid conduit, the fluid conduit directing fluid from the top of the housing toward the bottom of the housing outside of the filter chamber.

2. The filter of claim 1 wherein at least one of the first and second fittings of the filter comprises a receptacle arranged to receive one of the first and second fittings of the manifold.

3. The filter of claim 1 wherein the housing has a filtration chamber that contains the permeable filter medium and a fluid channel that extends from the upper region of the housing to a lower region of the filtration chamber and wherein one of the first and second fittings of the filter is fluidly coupled to the fluid channel.

4. The filter of claim 1 wherein the housing includes single-walled pressure vessel defining a filtration chamber that contains the permeable filter medium, the single-walled pressure vessel having an exterior exposed to the ambient environment and an interior defining the periphery of the filtration chamber, wherein the single-walled pressure vessel has sufficient structural integrity to withstand the difference between the ambient pressure and the operating pressure of a fluid being filtered.

* * * * *